United States Patent [19]

Mills

[11] Patent Number: 4,848,758
[45] Date of Patent: Jul. 18, 1989

[54] JEWELRY CLAMP

[76] Inventor: Neal C. Mills, P.O. Box 538, Los Alamos, N. Mex. 87544

[21] Appl. No.: 210,658

[22] Filed: Jun. 23, 1988

[51] Int. Cl.⁴ .............................................. B23Q 3/00
[52] U.S. Cl. ..................................... 269/16; 269/101; 269/238; 269/254 R; 248/118
[58] Field of Search ...................... 269/16, 45, 99, 100, 269/101, 328, 238, 254 CS; 228/57; 81/36, 7; 248/118, 118.1, 316.5; 128/346, 326, 354, 340

[56] References Cited

U.S. PATENT DOCUMENTS

| | | | |
|---|---|---|---|
| 2,183,680 | 12/1939 | Kahliff | 269/45 |
| 2,815,777 | 12/1957 | Iraids | 269/238 |
| 3,761,181 | 9/1973 | Monger | 228/57 |

FOREIGN PATENT DOCUMENTS 497208  8/1948  Canada .............................. 128/354

Primary Examiner—Frederick R. Schmidt
Assistant Examiner—David A. Holmes
Attorney, Agent, or Firm—William A. Eklund

[57] ABSTRACT

A clamp for holding small workpieces, such as jewelry, is disclosed. The clamp is rotatable and tiltable about a central mounting shaft, and includes hand rests extending transversely from each side of the clamp. The hand rests allow one's hands to be supported and stabilized while performing work on the workpiece, thereby reducing fatigue while also improving stability, accuracy and steadiness. In the preferred embodiment the clamp includes an integral flux cup for facilitating soldering operations.

12 Claims, 5 Drawing Sheets

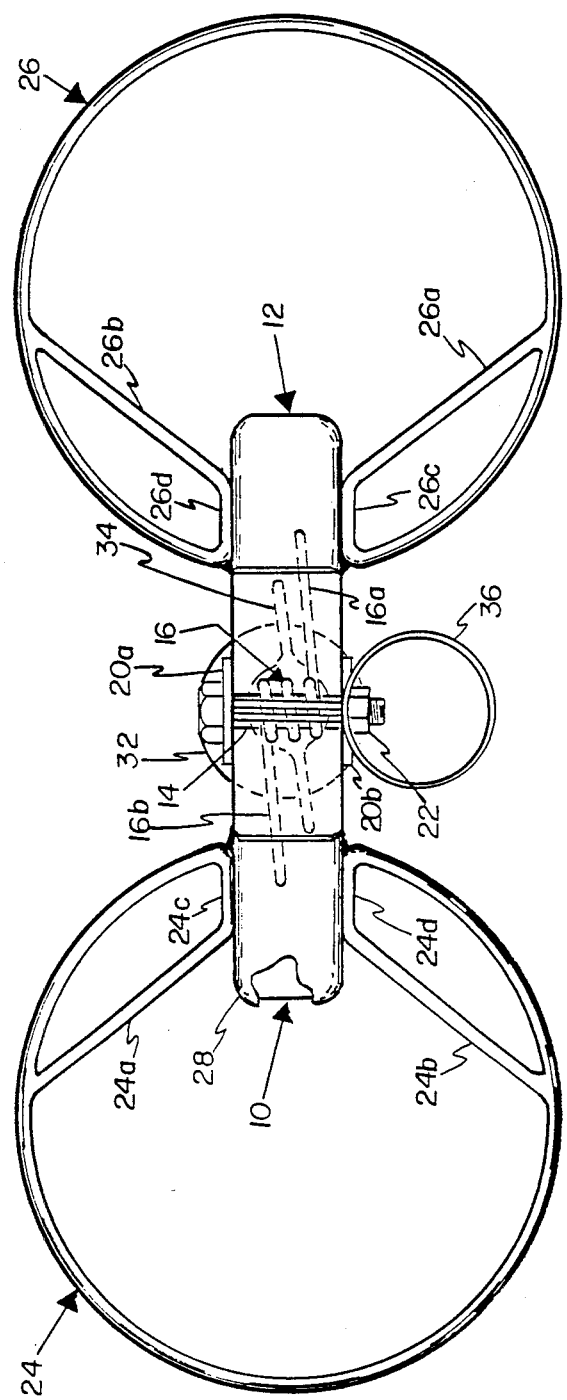

JEWELRY CLAMP

BACKGROUND OF THE INVENTION

The present invention is generally related to clamps and vices for holding small workpieces. More particularly, the present invention is related to clamps for holding jewelry during fabrication or repair.

Operations relating to the manufacture, repair, polishing, and cleaning of jewelry commonly require the use of small clamps or vises to firmly hold and position pieces of jewelry while they are being worked. Because of the nature of these operations, it is highly desirable that a clamp be capable of firmly positioning a piece of jewelry in any one of a number of different orientations. For the following reasons, previously available clamps have not been altogether satisfactory for this purpose.

There have been commercially available clamps and vises which utilize ball joints, universal joints, and the like to achieve limited capability for orienting small workpieces. However, such clamps and vises are typically small, and suffer from the dual disadvantages of being somewhat unstable and also not having any means for supporting the hands of the jeweler while working. In the absence of any support for one's hands, the precise work of the jeweler is made difficult and tiring. This is further aggraated in the case of clamps or vises which are relatively unstable, thus requiring the jeweler to compensate for the instability of the workpiece.

Accordingly, it is the object and purpose of the present invention to provide a clamp for holding small workpieces such as jewelry, and which provides support for a person's hands while performing work on the workpiece.

It is also an object and purpose of the present invention to provide a clamp which allows a workpiece to be held in various orientations during working, while also meeting the foregoing object of providing support for one's hands.

These and other objects and purposes of the invention will become more apparent upon consideration of the following descriptions of the invention.

SUMMARY OF THE INVENTION

The present invention provides a jewelry clamp comprising a pair of clamp arms pivotally connected so as to have adjacent ends of the arms which engage in opposition in a manner suitable for holding a workpiece, and including spring means for loading the arms such that the opposing ends are maintained in compression against one another. The clamp further includes a mounting shaft which is pivotably attached to the arms so as to allow the arms to rotate about the vertical axis of the mounting shaft and to also rotate to a limited extent about the axis of a pivot shaft connecting the two arms. The clamp further includes hand supports extending transversely and outwardly from the clamp arms. The hand supports allow a jeweler to rest his or her hands on the supports while working a piece of jewelry held in the clamp, thereby reducing fatigue and at the same time improving stability and steadiness.

BRIEF DESCRIPTION OF THE DRAWINGS

The accompanying drawings, which are incorporated in and form a part of the specification, illustrate the preferred embodiment of the invention and, taken with the description which follows, serve to explain the principles and operation of the invention.

In the Figures:

FIG. 5 is a plan view of the the clamp of FIG. 1.

DETAILED DESCRIPTION OF THE PREFERRED EMBODIMENT

Figure 1:
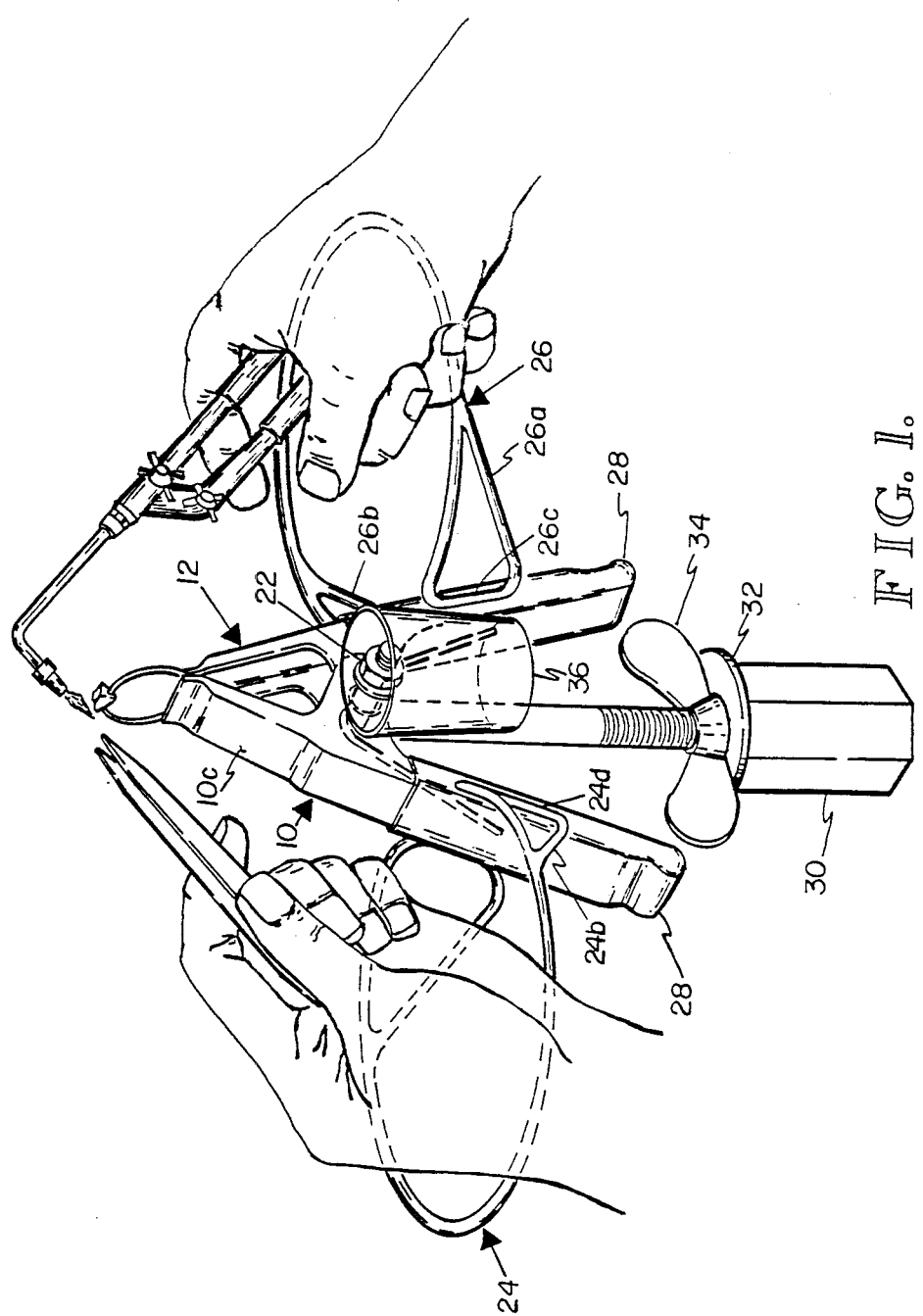
FIG. 1 is an isometric view of the preferred embodiment of the jewelry clamp of the present invention, illustrating how it is used to hold a small piece of jewelry during repair or manufacture.
Figure 2:
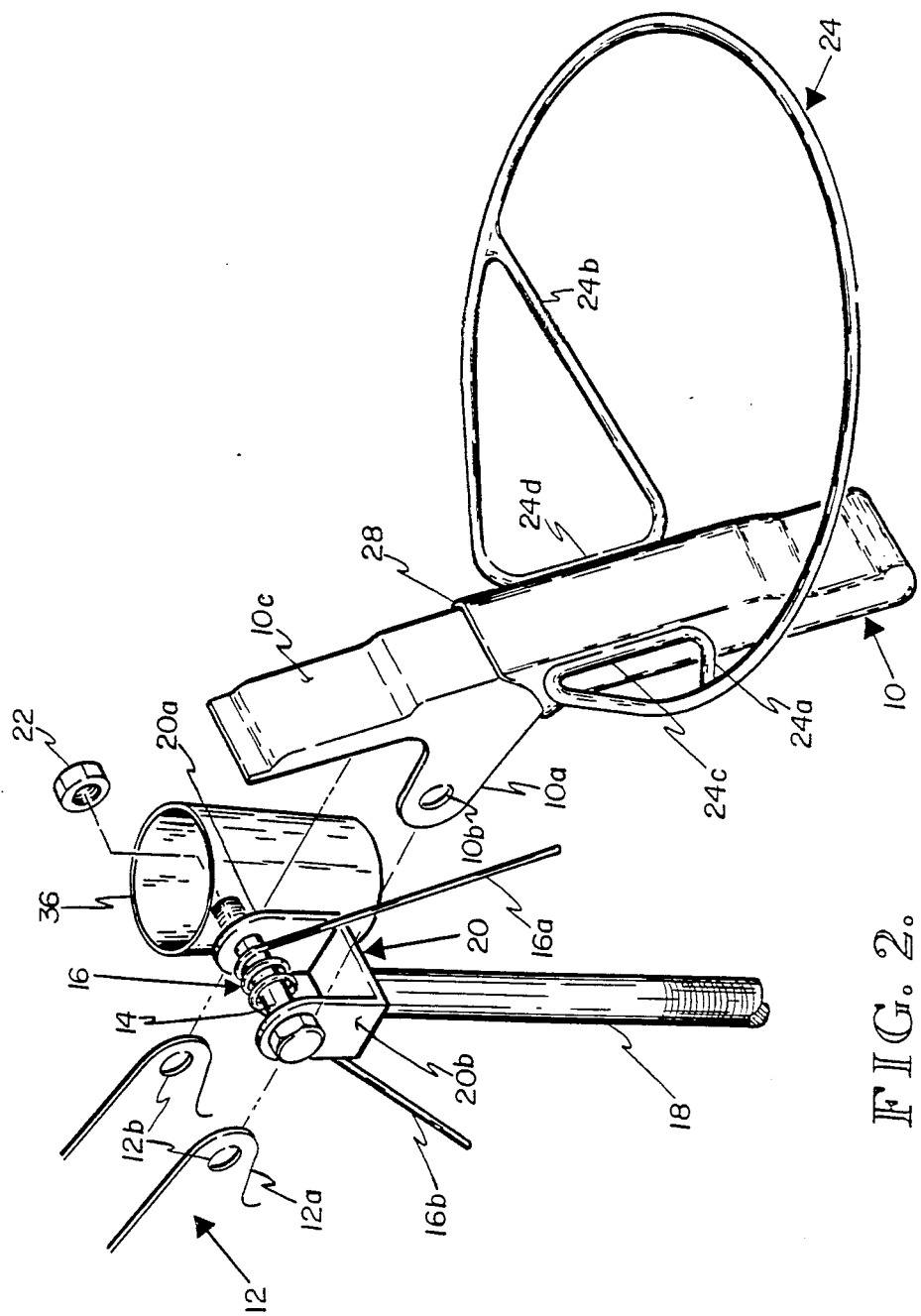
FIG. 2 is an exploded partial isometric view of the clamp of FIG. 1.
Figure 3:
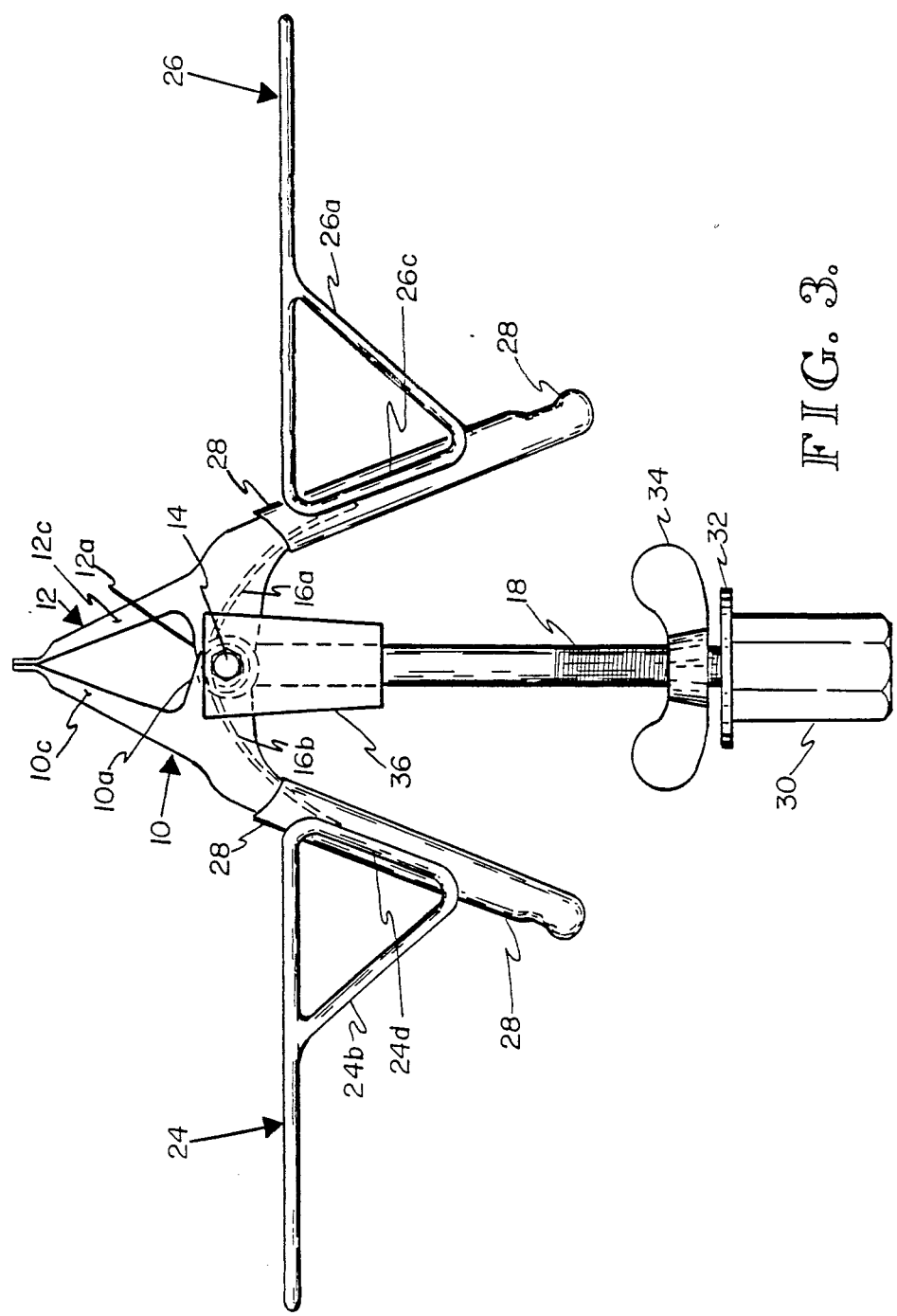
FIG. 3 is a side view of the clamp of FIG. 1.
Figure 4:
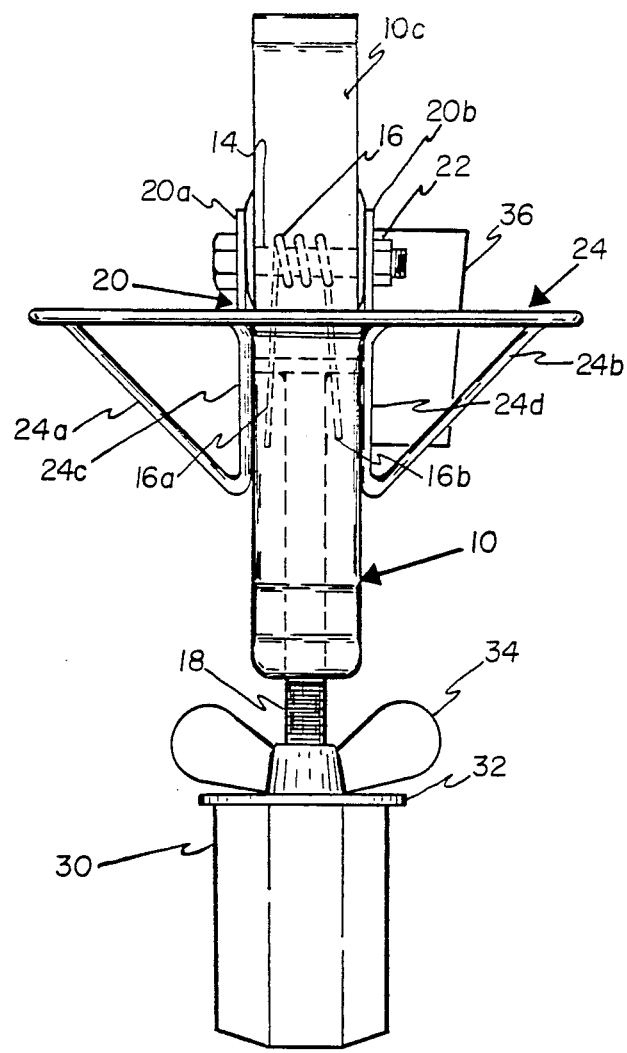
FIG. 4 is an end view of the clamp of FIG. 1.

Referring to the Figures, there is illustrated a preferred embodiment of the jewelry clamp of the present invention. The clamp includes a pair of elongate, generally rectangular arms 10 and 12 which are generally maintained in an upright position during use, as shown in the Figures. The arms 10 and 12 include pairs of integral, inwardly extending ears 10a and 12a, respectively, which overlap one another in assembly. Each pair of ears 10a and 12a includes coaxial bores 10b and 12b (FIG. 2) which are aligned with one another and through which a pivot shaft 14 extends. The arms 10 and 12 rotate with respect to one another about the pivot shaft 14, such that the upper ends 10c and 12c of the arms 10 and 12 meet and oppose one another to form the jaws of the clamp. The lower ends of the arms 10 and 12 form handles by which the clamp may be opened. A coil spring 16 encircles the pivot shaft 14. The opposite ends 16a and 16b of the coil spring 16 extend downwardly and drive the lower ends of the arms 10 and 12 outwardly, such that upper ends 10c and 12c of the arms 10 and 12 are maintained in compression against one another.

The clamp further includes an upright threaded mounting shaft 18 on which the clamp arms 10 and 12 are mounted. The upper end of the threaded shaft 18 is affixed to the bottom of a U-shaped bracket 20 which includes integral, upwardly extending arms 20a and 20b. The arms 20a and 20b include bores which are aligned with one another as well as with the bores of the clamp arm ears 10a and 12a, and through which the pivot shaft 14 also extends. A nut 22 is engaged with the threaded end of the pivot shaft 14. It will be seen that the clamp arms 10 and 12 can be rotated as a unit to a limited extent about the axis of the pivot shaft 14, with the nut 22 being adjustable to lock the arms 10 and 12 in position and yet also allow their positioning at any orientation within the range of rotation about the pivot shaft 14. Rotation of the arms 10 and 12 about the pivot shaft 14 allows a piece of jewelry or other workpiece to be oriented in a range of positions while held firmly in the clamp.

The clamp further includes a pair of transversely extending hand rests 24 and 26, which are fastened respectively to the clamp arms 10 and 12. Each of the hand rests 24 and 26 is substantially circular in shape, with the plane of each of the circular rests 24 and 26 being generally perpendicular to the longitudinal axes of the respective clamp arms. The hand rests 24 and 26 are formed of an appropriate length of suitable rod material, bent into the illustrated shape. More particularly, hand rest 24 includes a pair of integral structural braces 24a and 24b, which are formed by bending the opposite ends of the constituent rod material back upon themselves and welding or brazing them to the circular portion of the rest 24, while also leaving straight intermediate sections 24c and 24d. The intermediate sections 24c and 24d are spot welded or brazed to the edges of the clamp arm 10.

The second hand rest 26 is likewise constructed, with integral braces 26a and 26b, and with intermediate integral straight sections 26c and 26d which are spot welded or brazed to the edges of the clamp arm 12.

A coating 28 of a polymeric elastomer is provided on the lower portions of the clamp arms 10 and 12, which comprise the handles of the clamp, as well as on the hand rests 24 and 26. The polymeric coating 28 forms a grip on the handles of the clamp, and also forms a comfortable anti-slip surface on the hand rests 24 and 26. The layer 28 is best formed by dipping the assembled clamp arms 10 and 12 and hand rests 24 and 26 into a commercially available liquid elastomer, which is self-curing upon exposure to air.

The lower end of the threaded shaft 18 is engaged in a threaded bore of a hexagonal plug 30. The plug 30 is selected for mounting purposes because it can be easily inserted in a cylindrical bore drilled into a variety of workbench surfaces, being fastened in place with a variety of commercial cements or resins. Welded to the top of the plug 30 is a washer 32, which prevents the plug 30 from being inserted below the surface of a workbench. A wing nut 34 on the threaded shaft 18 allows the clamp to be rotated about the axis of the shaft 18, and yet also be locked into any desired position.

The clamp further includes a flux cup 36 affixed to the end of the pivot shaft 14. The flux cup 36 serves to hold flux used in soldering operations. In performing soldering operations jewelers make frequent use of such flux, such that having the cup 36 attached directly to the clamp where it is near the workpiece renders the soldering operation more efficient.

It will be seen that one advantage of the clamp of the present invention is that it can be comfortably opened by simply pushing gently downwardly on the hand rests 24 and 26, without having to remove one's hands from the vicinity of the workpiece or even from the workpiece itself. This is particularly convenient in operations which require frequent adjustments to the position of the workpiece. The clamp can be released in this manner with the hands, while the workpiece is simultaneously positioned with the hands, all the while with the hands remaining in close proximity to the workpiece.

The foregoing description of a preferred embodiment of the present invention is presented for purposes of illustration and description. It is not intended to be exhaustive or limit the invention to the precise form disclosed, and it will be apparent that various modifications, alterations, and substitutions may be made by one of ordinary skill in the art, without departing from the essential invention. Accordingly, it intended that the scope of the invention be defined only by the following claims.

The embodiments of the invention in which patent protection is claimed are:

1. A clamp for holding a small workpiece, comprising first and second elongate clamp arms each having upper and lower ends, said arms being pivotably connected to one another at an intermediate point along their lengths to permit relative swinging motion so as to allow said upper ends of said arms to swing together in opposition to one another, spring means for said biasing upper opposing ends of said arms opposed against one another in compression with one another, first and second hand rest means for receiving and supporting hand, while a workpiece is being held in the clamp, and said hand rest means extending transversely from said first and second clamp arms respectively, and mounting means for mounting said clamp on a workbench.

2. The clamp defined in claim 1 wherein said first and second hand rest means comprise circular rings extending transveresly outwardly from and affixed to said clamp arms.

3. The clamp defined in claim 2 wherein each of said clamp arms include integral ears extending transversely therefrom, and a pivot shaft extending between and connecting said ears so as to allow said clamp arms to rotate with respect to one another.

4. The clamp defined in claim 3 wherein said spring means includes a coil spring encircling said pivot shaft, said coil spring including opposite ends which urge said lower ends of said clamp arms outwardly so as to thereby maintain said upper ends of said clamp arms in compression against one another.

5. The clamp defined in claim 4 further including a flux cup attached to one end of said pivot shaft for holding flux during soldering operations.

6. The clamp defined in claim 5 wherein said each of said hand rest means includes a pair of integral braces extending from said circular rings to said lower ends of said clamp arms.

7. A clamp for holding a small workpiece such as jewelry, comprising first and second clamp arms, said clamp arms each including a pair of integral ears extending transversely therefrom, said ears having coaxial bores therethrough, a pivot shaft extending through said bores so as to pivotably connect said arms such that upper ends of said arms oppose one another to form jaws of said clamp, spring means for said biasing upper ends of said clamp arms against one another, and hand rest means for receiving and supporting hands, while a workpiece is being held in the clamp, and said hand rest means extending transversely from said each of said clamp arms for supporting a person's hands while using said clamp.

8. The clamp defined in claim 7 wherein said hand rest means include first and second substantially circular rings affixed to said clamp arms.

9. The clamp defined in claim 8 wherein said substantially circular rings include integral braces extending from rings to said clamp arms.

10. The clamp defined in claim 9 further including a flux cup attached to said pivot shaft of said clamp.

11. The clamp defined in claim 9 further including mounting means, said mounting means including a threaded shaft for engagement in a suitable rigid base, a U-shaped bracket affixed to one end of said threaded shaft, said U-shaped bracket having first and second arms having coaxial bores therethrough, said pivot shaft of said clamp passing through said bores of said U-shaped bracket, whereby said clamp is pivotable about said pivot shaft while mounted on said threaded shaft.

12. The clamp defined in claim 11 further including a hexagonal plug having a threaded bore engageable with said threaded shaft, said hexagonal plug being insertable in an appropriately sized cylindrical bore in a suitable work bench surface, said hexagonal plug including a washer integrally affixed to one end thereof to limit the depth of insertion of said plug into a cylindrical bore, and wing nut means engaged on said threaded shaft to permit selective rotation and fixing of said clamp arms about said threaded shaft.

* * * * *